US009528419B2

(12) United States Patent
Aoki

(10) Patent No.: US 9,528,419 B2
(45) Date of Patent: Dec. 27, 2016

(54) PARTICULATE MATTER CONTROLLER FOR AN INTERNAL COMBUSTION ENGINE

(75) Inventor: Keiichiro Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 377 days.

(21) Appl. No.: 13/979,730

(22) PCT Filed: Feb. 1, 2011

(86) PCT No.: PCT/JP2011/052025
§ 371 (c)(1),
(2), (4) Date: Jul. 15, 2013

(87) PCT Pub. No.: WO2012/104994
PCT Pub. Date: Aug. 9, 2012

(65) Prior Publication Data

US 2013/0298535 A1 Nov. 14, 2013

(51) Int. Cl.
*G01M 15/10* (2006.01)
*F01N 11/00* (2006.01)
(Continued)

(52) U.S. Cl.
CPC ........... *F01N 11/00* (2013.01); *F02D 41/1466* (2013.01); *F02D 41/2441* (2013.01); *F02D 41/2474* (2013.01); *F02D 41/1494* (2013.01)

(58) Field of Classification Search
CPC ...... F01N 3/023; F01N 11/00; F02D 41/1466; F02D 41/1494; F02D 41/2441; F02D 41/2474
(Continued)

(56) References Cited

U.S. PATENT DOCUMENTS 5,276,625 A 1/1994 Nakaniwa
6,311,480 B1 11/2001 Suzuki et al.
(Continued)

FOREIGN PATENT DOCUMENTS

DE 102010029512 * 12/2010 ............. F01N 11/00
JP A-03-064653 3/1991
(Continued)

OTHER PUBLICATIONS

English translation of the International Preliminary Report on Patentability for PCT/JP2011/052025, Original report in Japanese completed Dec. 17, 2012.*

*Primary Examiner* — Eric S McCall
(74) *Attorney, Agent, or Firm* — Oliff PLC

(57) ABSTRACT

Disclosed is a method for correcting characteristic variation of a PM sensor and improving detection accuracy of the sensor. The PM sensor has a pair of electrodes for capturing the PM in an exhaust gas, and a sensor output changes in accordance with a captured amount of the PM. If the sensor output gets close to a saturated state, the PM combustion control for combusting and removing the PM is executed. If a zero-point output of the PM sensor is to be corrected, first, a sensor output at a point of time when predetermined time required for combustion of the PM has elapsed after electrical conduction to the heater is started by the PM combustion control is obtained. Then, the sensor output at an arbitrary point of time is corrected. As a result, correction of the sensor can be made smoothly by using existing PM combustion control.

6 Claims, 11 Drawing Sheets

(51) Int. Cl.
*F02D 41/14* (2006.01)
*F02D 41/24* (2006.01)

(58) Field of Classification Search
USPC .......... 73/1.06–1.07, 114.69, 114.71, 114.72, 73/114.73, 114.75; 60/276; 123/674, 688, 123/697; 701/30.3, 30.8, 31.1–31.2
See application file for complete search history.

(56) References Cited

U.S. PATENT DOCUMENTS 8,281,574 B2 * 10/2012 Yamada et al. ......... F01N 3/023
8,482,288 B2 * 7/2013 Yokoi et al. ........ F02D 41/1466
8,490,465 B2 * 7/2013 Ante et al. .......... F02D 41/1466
8,752,368 B2 * 6/2014 Ante et al. .................. 60/276 X
8,839,610 B2 * 9/2014 Aoki ................... F02D 41/1466
9,008,949 B2 * 4/2015 Onishi .................... F01N 11/00
9,027,327 B2 * 5/2015 Johnson et al. ........ F01N 3/023
9,046,017 B2 * 6/2015 Nakazato et al. ...... F01N 3/023
2001/0002550 A1 * 6/2001 Zhang et al. ................ 73/118.1
2007/0101697 A1 * 5/2007 Yahata et al. ........... F01N 11/00
2009/0094963 A1 * 4/2009 Mizoguchi .............. F01N 3/101 60/286
2009/0126458 A1 * 5/2009 Fleischer et al. ... F02D 41/1466
2010/0300179 A1 12/2010 Umehara
2011/0072787 A1 * 3/2011 Hubbard et al. ................ 60/276
2012/0011829 A1 * 1/2012 Taibi et al. ................. 60/276 X
2012/0031077 A1 * 2/2012 Aoki ..................... F01N 13/008 60/276
2012/0260636 A1 * 10/2012 Hashida .................. F01N 11/00 60/276
2013/0008231 A1 * 1/2013 Nishijima .......... G01N 15/0656 73/28.01
2013/0030678 A1 * 1/2013 Aoki ....................... F01N 9/002 701/113
2013/0298537 A1 * 11/2013 Aoki ....................... F01N 3/023 60/311
2014/0234174 A1 * 8/2014 Shibata .............. B01D 53/9477 422/111

FOREIGN PATENT DOCUMENTS

JP A-2000-282942 10/2000
JP A-2003-201907 7/2003
JP A-2003-314248 11/2003
JP A-2004-251627 9/2004
JP A-2009-144577 7/2009
JP A-2010-275952 12/2010
WO WO 2009115542 A1 * 9/2009 .............. F01N 11/00
WO WO 2010140263 A1 * 12/2010 .............. F01N 11/00

* cited by examiner

PARTICULATE MATTER CONTROLLER FOR AN INTERNAL COMBUSTION ENGINE

TECHNICAL FIELD

The present invention relates to a controller for an internal combustion engine, provided with a PM sensor for detecting an amount of particulate matter (PM) contained in an exhaust gas, for example.

BACKGROUND ART

As a prior-art technique, a controller for an internal combustion engine, provided with an electric resistance type PM sensor is known as disclosed in Patent Literature 1 (Japanese Unexamined Patent Application Publication No. 2009-144577), for example. The prior-art PM sensor includes a pair of electrodes provided on an insulating material and is configured such that, when PM in the exhaust gas is captured between these electrodes, a resistance value between the electrodes is changed in accordance with the captured amount. As a result, in the prior-art technique, the PM amount in the exhaust gas is detected on the basis of the resistance value between the electrodes. Moreover, in the prior-art technique, a PM sensor is arranged downstream of a particulate filter that captures the PM in the exhaust gas and failure diagnosis of the particulate filter is made on the basis of a detected amount of the PM.

The applicant recognizes the following documents including the above-described document as relating to the present invention.

CITATION LIST

Patent Literature

Patent Literature 1: Japanese Patent Laid-Open No. 2009-144577
Patent Literature 2: Japanese Patent Laid-Open No. 2004-251627
Patent Literature 3: Japanese Patent Laid-Open No. 2003-314248
Patent Literature 4: Japanese Patent Laid-Open No. 2000-282942

SUMMARY OF INVENTION

Technical Problem

In the prior-art technique, an electric resistance type PM sensor is used to make failure diagnosis of the particulate filter. However, in the electric resistance type PM sensor, zero-point output or the output sensitivity can vary depending on an individual difference, installation environment and the like of the sensor. Thus, the prior-art technique has a problem of deteriorating detection accuracy due to characteristic variation of the PM sensor and difficulty in stable failure diagnosis of the particulate filter.

The present invention has been made in order to solve the above described problems and has an object to provide a controller of an internal combustion engine which can correct characteristic variation of the PM sensor appropriately and can raise detection accuracy and improve reliability of the sensor.

Means for Solving the Problem

A first invention is characterized by including a PM sensor having a detection portion for capturing particulate matters in an exhaust gas and outputting a detection signal according to the captured amount and a heater for heating the detection portion;

PM combusting means for combusting and removing the particulate matters by electrical conduction to the heater if a predetermined amount of the particulate matters are captured by the detection portion of the PM sensor; and zero-point correcting means for obtaining a detection signal outputted from the detection portion as a zero-point output of the PM sensor when predetermined time required for combustion of particulate matters has elapsed after electrical conduction to the heater by the PM combusting means is started and correcting the detection signal at an arbitrary point of time on the basis of the zero-point output.

According to a second invention, said zero-point correcting means is configured to correct the detection signal at an arbitrary point of time on the basis of a difference between the zero-point output obtained when electrical conduction to said heater is turned on and a reference value of the zero-point output stored in advance.

A third invention is provided with zero-point abnormality determining means for determining that the PM sensor has failed if the zero-point output obtained by the zero-point correcting means is out of a predetermined zero-point allowable range.

According to a fourth invention, said PM sensor is an electric resistance type sensor outputting the detection signal according to a resistance value when said resistance value between a pair of electrodes is changed in accordance with an amount of particulate matters caught between the electrodes constituting said detection portion; and a failure cause estimating means is provided for estimating a cause of the failure on the basis of a size relationship between the zero-point output obtained by said zero-point correcting means and a reference value of the zero-point output stored in advance, if it is determined by said zero-point abnormality determining means that said PM sensor has failed.

A fifth invention is provided with sensitivity correcting means that is provided for measuring a parameter corresponding to power supplied to said heater while said detection signal changes from a first signal value to a second signal value different from the signal value in a state where electrical conduction to said heater is turned on by said PM combusting means and for correcting output sensitivity of said detection signal with respect to the caught amount of the particulate matters on the basis of the parameter.

According to a sixth invention, the sensitivity correcting means is configured to calculate a detection signal after sensitivity correction by calculating a sensitivity coefficient whose value increases as the parameter becomes larger and by multiplying the detection signal outputted from the detection portion before the sensitivity correction by the sensitivity coefficient, and the controller for an internal combustion engine comprises sensitivity abnormality determining means for determining that the PM sensor has failed if the sensitivity coefficient is out of a predetermined sensitivity allowable range.

Advantageous Effects of Invention

According to the first invention, even in a state where the PM sensor is operated as usual, the zero-point output including variation specific to the sensor can be obtained smoothly by using timing of removing the PM of the detection portion by the PM combusting means. Moreover, since the zero-point output is obtained when predetermined time has elapsed after electrical conduction to the heater is turned on and removal of the PM has been completed, even in a state where a large quantity of the PM is present in the exhaust gas, for example, the zero-point output can be accurately obtained while adhesion of new PM to the detection portion is prevented. Thus, the zero-point correction of the PM sensor can be made easily on the basis of the obtained zero-point output, and detection accuracy of the sensor can be improved.

According to the second invention, the zero-point correcting means can correct the detect signal at an arbitrary point of time on the basis of a difference between the zero-point output obtained during electrical conduction to the heater and the reference value of the zero-point output stored in advance.

According to the third invention, the zero-point abnormality determining means can determine whether or not the zero-point output variation is within a normal range by using the zero-point correction of the PM sensor by the zero-point correcting means. As a result, a failure of the PM sensor such that the zero-point output is largely shifted can be easily detected without providing a special failure diagnosis circuit and the like. When a failure is detected, it can be handled rapidly by means of control, an alarm and the like.

According to the fourth invention, the failure cause estimating means can estimate a cause of a failure on the basis of a size relationship between the zero-point output obtained by the zero-point correcting means and the reference value of the zero-point output stored in advance. As a result, an appropriate measure can be taken in accordance with the cause of the failure.

According to the fifth invention, even in a state where the PM sensor is operated as usual, sensitivity correction of the sensor can be made by using timing of combusting the PM of the detection portion by the PM combusting means. As a result, variation in the zero point and sensitivity of the PM sensor can be corrected, respectively, and detection accuracy of the sensor can be reliably improved.

According to the sixth invention, it can be determined whether or not the output sensitivity variation is within a normal range by using the sensitivity correction of the PM sensor by the sensitivity correcting means. As a result, a failure of the PM sensor such that the output sensitivity is largely shifted can be easily detected without providing a special failure diagnosis circuit and the like. When a failure is detected, it can be handled rapidly by means of control, an alarm and the like.

DESCRIPTION OF EMBODIMENTS

First Embodiment

Configuration of the First Embodiment

Figure 1:
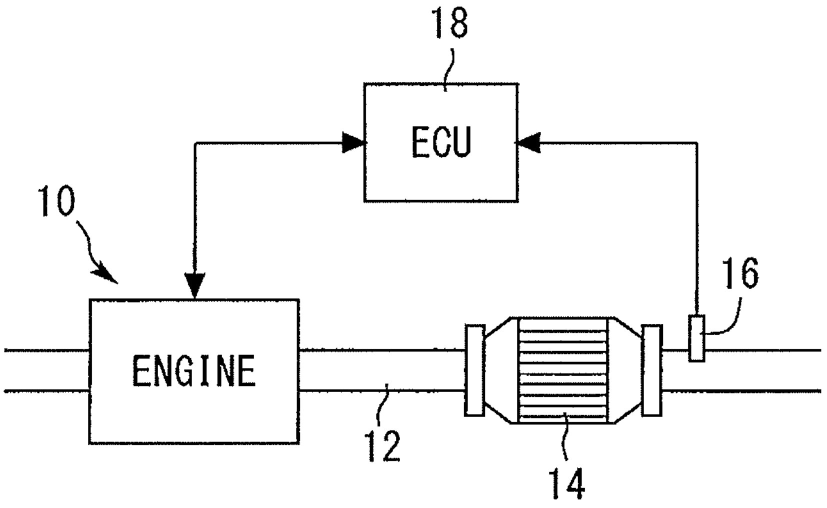
FIG. 1 is an entire configuration diagram for explaining a system configuration of the first embodiment of the present invention.

A first embodiment of the present invention will be described below by referring to FIGS. 1 and 6. FIG. 1 is an entire configuration diagram for explaining a system configuration of the first embodiment of the present invention. A system of this embodiment is provided with an engine 10 as an internal combustion engine, and a particulate filter 14 for capturing PM in an exhaust gas is provided in an exhaust passage 12 of the engine 10. The particulate filter 14 is composed of a known filter including a DPF (Diesel Particulate Filter) and the like, for example. Moreover, in the exhaust passage 12, an electric resistance type PM sensor 16 detecting a PM amount in the exhaust gas downstream of the particulate filter 14 is provided. The PM sensor 16 is connected to an ECU (Electronic Control Unit) 18 controlling an operation state of the engine 10. The ECU 18 is composed of an arithmetic processing unit provided with a storage circuit including a ROM, a RAM, a nonvolatile memory and the like, for example, and an input/output port and is connected to various types of sensors and an actuator mounted on the engine 10.

Figure 2:
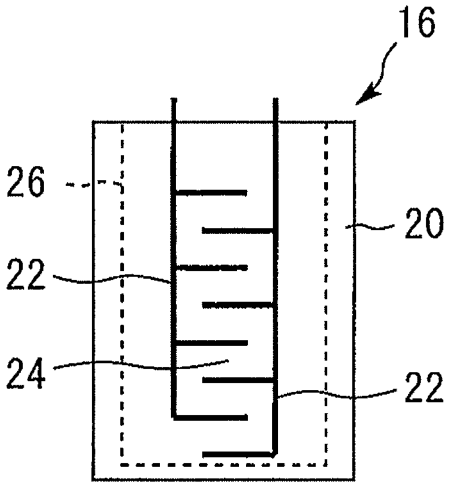
FIG. 2 is a configuration diagram roughly illustrating a configuration of a PM sensor.
Figure 3:
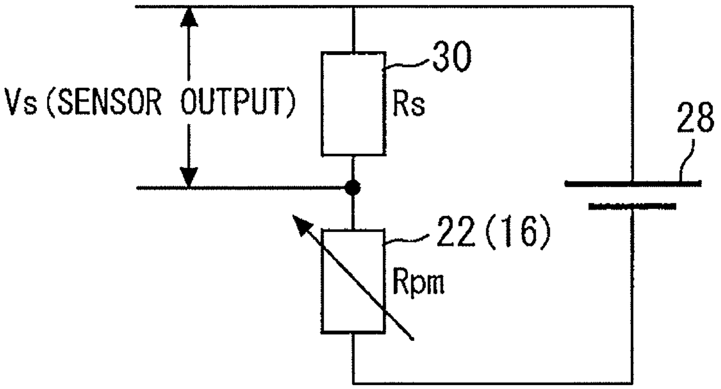
FIG. 3 is an equivalent circuit diagram illustrating a configuration of a detection circuit including the PM sensor.

Subsequently, the PM sensor 16 will be described by referring to FIGS. 2 and 3. First, FIG. 2 is a configuration diagram roughly illustrating the configuration of the PM sensor. The PM sensor 16 is provided with an insulating material 20, electrodes 22 and 22, and a heater 26. The electrodes 22 and 22 are formed of a metal material, each having a serrated shape, for example, and are provided on the front surface side of the insulating material 20. Moreover, the electrodes 22 are arranged so as to be meshed with each other and are faced with each other with a gap 24 having a predetermined dimension. These electrodes 22 are connected to an input port of the ECU 18 and constitute a detection portion for outputting a detection signal in accordance with a captured amount of the PM captured between the electrodes 22.

The heater 26 is formed of a heat generating resistance body such as metal, ceramics and the like and is provided on the back surface side of the insulating material 20 at a position covering each of the electrodes 22, for example. The heater 26 is operated by means of electrical conduction from the ECU 18 and is configured to heat each of the electrodes 22 and the gap 24. The ECU 18 has a function of calculating supply power on the basis of a voltage and a current applied to the heater 26 and of calculating a supply power integrated amount to the heater by temporally integrating the calculated value.

On the other hand, the PM sensor 16 is connected to a detection circuit built in the ECU 18. FIG. 3 is an equivalent circuit diagram illustrating a configuration of the detection circuit including the PM sensor. As illustrated in this diagram, each of the electrodes 22 (resistance value: Rpm) of the PM sensor 16 and a fixed resistor 30 (resistance value: Rs) such as a shunt resistor are connected in series to a DC voltage source 28 of the detection circuit. According to this circuit configuration, since a potential difference Vs between the both end sides of the fixed resistor 30 changes in accordance with the resistance value Rpm between the electrodes 22, the ECU 18 is configured to read this potential difference Vs as a detection signal (sensor output) outputted from the PM sensor 16.

Figure 4:
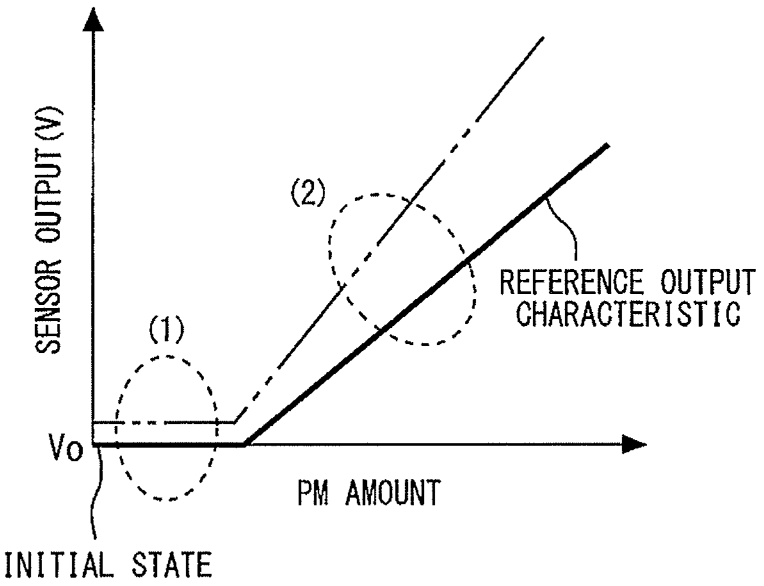
FIG. 4 is a characteristic diagram illustrating output characteristics of the PM sensor.

The system of this embodiment has the configuration as above, and subsequently, its basic operation will be described. First, FIG. 4 is a characteristic diagram illustrating output characteristics of the PM sensor, and a solid line in the figure indicates a reference output characteristic set in advance at designing of the sensor or the like. The output characteristic illustrated in this figure schematically illustrates an actual output characteristic of the PM sensor. As indicated by the solid line in FIG. 4, in an initial state where PM is not captured between the electrodes 22 of the sensor, a resistance value Rpm between the electrodes 22 insulated by the gap 24 is sufficiently large, and a sensor output $V_s$ is kept at a predetermined voltage value V0. In the following explanation, this voltage value V0 is assumed to be referred to as a reference value of the zero-point output. The zero-point output reference value V0 is determined as a rated voltage value (0V, for example) at designing of the sensor or the like and is stored in advance in the ECU 18.

On the other hand, if the PM in the exhaust gas is captured between the electrodes 22, electricity is turned on between the electrodes 22 by the PM having conductivity and thus, as the PM captured amount increases, the resistance value Rpm between the electrodes 22 lowers. Thus, the more the PM captured amount (that is, the PM amount in the exhaust gas) is, the higher sensor output increases, and an output characteristic as illustrated in FIG. 4, for example, is obtained. During a period from when the PM captured amount gradually increases from the initial state to when electrical conduction between the electrodes 22 is started, the value stays in an insensitive zone where the sensor output does not change even if the captured amount increases.

Moreover, if a large quantity of the PM is captured between the electrodes 22, the sensor output enters a saturated state, and PM combustion control is executed so as to remove the PM between the electrodes 22. In the PM combustion control, the PM between the electrodes 22 is heated and combusted by electrical conduction to the heater 26, and the PM sensor is returned to the initial state. The PM combustion control is started when the sensor output becomes larger than a predetermined output upper limit value corresponding to the saturated state, for example, and is stopped when predetermined time required for removal of the PM has elapsed or the sensor output is saturated in the vicinity of the zero-point output.

On the other hand, the ECU 18 executes the filter failure determination control diagnosing a failure of the particulate filter 14 on the basis of the output of the PM sensor 16. At a failure of the particulate filter 14, its PM capturing capacity lowers and the PM amount flowing downstream of the filter increases and thus, a detection signal of the PM sensor 16 becomes large. Thus, in the filter failure determination control, if the sensor output becomes larger than a predetermined failure determination value (sensor output when the filter is normal), for example, it is diagnosed that the particulate filter 14 has failed.

Features of this Embodiment

In the electric resistance type PM sensor 16, as indicated by a virtual line in FIG. 4, zero-point output variation (1) or the output sensitivity variation (2) to the reference output characteristic can easily occur. The variation of the zero-point output V0 is caused by variation in the detection circuit or the like in many cases. The variation in the output sensitivity (change rate of the sensor output to the change in the PM amount) is caused by variation in the mounted position or direction of the PM sensor 16 in the exhaust passage 12, or variation in electric field intensity distribution between the electrodes 22 in many cases. As described above, in a state where variations in the sensor characteristics are present, accurate diagnosis of a failure of the particulate filter 14 is difficult. Thus, sensitivity correction control described below is executed in this embodiment.

(Zero-Point Correction Control)

Figure 5:
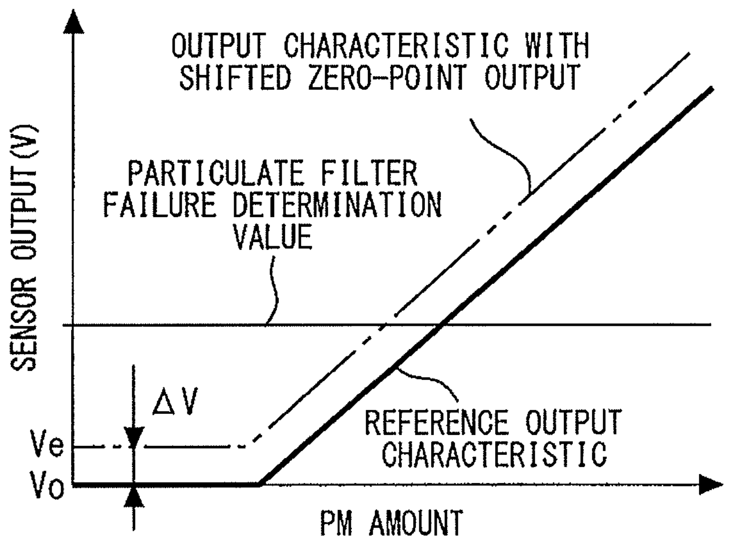
FIG. 5 is an explanatory diagram illustrating contents of the zero-point correction control.

In this control, variation in the zero-point output V0 is corrected by using the PM combustion control. Specifically speaking, in the zero-point correction control, first, electrical conduction to the heater 26 is started by the PM combustion control and then, elapse of predetermined conduction time required for full combustion of the PM between the electrodes 22 is awaited. At a point of time when this conduction time has elapsed, the PM sensor 16 has entered the initial state where the PM between the electrodes 22 has been removed. Thus, in the zero-point correction control, when the above described conduction time has elapsed, a detection signal (sensor output $V_s$) outputted from the electrode 22 is obtained as a zero-point output $V_e$ of the PM sensor 16 while electrical conduction to the heater 26 is continued, and this zero-point output $V_e$ is stored in a nonvolatile memory and the like as a learned value of variation. FIG. 5 is an explanatory diagram illustrating contents of the zero-point correction control. As illustrated in FIG. 5, a difference ΔV ($=V_e-V0$) between the learned value $V_e$ of the zero-point output and the reference value V0 corresponds to the variation in the zero-point output.

Subsequently, if an output of the PM sensor 16 is used in the above described filter failure determination control and the like, a sensor output is corrected on the basis of the learned result. Specifically, the sensor output $V_{out}$ after the zero-point correction is calculated by the following formulas (1) and (2) on the basis of the sensor output $V_s$ at an arbitrary point of time, the reference value V0 of the zero-point output, the learned value $V_e$ of the zero-point output. Then, the filter failure determination control is executed on the basis of this sensor output $V_{out}$.

$$\Delta V=V_e-V0 \tag{1}$$

$$V_{out}=V_s-\Delta V \tag{2}$$

According to the above control, even in a state where the PM sensor 16 is operated as usual, the zero-point output including variation specific to the sensor can be smoothly obtained by using timing of removing the PM between the electrodes 22 by means of the PM combustion control.

Moreover, in this embodiment, the zero-point output $V_e$ is obtained as soon as (or preferably in a state where electrical conduction to the heater 26 is on even after removal of the PM has been completed) predetermined conduction time has elapsed after electrical conduction to the heater 26 is turned on and removal of the PM is completed. Thus, even if a large quantity of the PM is present in the exhaust gas, for example, the zero-point output $V_e$ can be accurately obtained while adhesion of new PM between the electrodes 22 is prevented.

The sensor output $V_s$ at an arbitrary point of time can be corrected appropriately on the basis of the obtained zero-point output $V_e$ and the reference value V0 of the zero-point output stored in advance, and an influence of the variation in the zero-point output on the sensor output can be reliably removed. Therefore, according to this embodiment, the zero-point correction of the PM sensor 16 can be made easily by using the existing PM combustion control. The detection accuracy of the PM sensor 16 can be improved, the filter failure determination control and the like can be accurately executed, and reliability of the entire system can be improved.

Specific Processing for Realizing First Embodiment

Subsequently, specific processing for realizing the above described control will be described by referring to FIG. 6. FIG. 6 is a flowchart illustrating control executed by the ECU in the first embodiment of the present invention. A routine illustrated in this flowchart is assumed to be repeatedly executed during an operation of the engine. In the routine illustrated in FIG. 6, first, at Step 100, it is determined whether or not the engine has been started and the PM sensor 16 is normal (no abnormality in sensor output or disconnection in the heater).

Subsequently, at Step 102, it is determined whether or not execution timing of the PM combustion control has arrived. Specifically, it is determined whether or not the sensor output has exceeded a predetermined upper limit value corresponding to a saturated state, for example. If this determination is positive, electrical conduction to the heater 26 is turned on at Step 104. Moreover, if the determination at Step 102 is negative, the routine proceeds to Step 114 which will be described later. Subsequently, at Step 106, it is determined whether or not the end timing of the PM combustion control has arrived (whether or not the predetermined conduction time has elapsed after electrical conduction to the heater 26 is started), and electrical conduction is continued until this determination is positive. If the above described conduction time has elapsed, at Step 108, the sensor output is read, and the read value is stored as the learned value $V_e$ of the zero-point output while the state of electrical conduction to the heater 26 is kept. Then, at Step 110, the electrical conduction to the heater 26 is stopped.

Subsequently, at Step 112, it is determined whether or not the predetermined time has elapsed after electrical conduction to the heater 26 is stopped, and satisfaction of the determination is awaited. Step 112 has a purpose of awaiting until the temperature of the PM sensor 16 has sufficiently lowered and the PM capturing efficiency has risen without using the sensor output. If the determination at Step 112 is positive, at Step 114, use of the PM sensor 16 is started. That is, at Step 114, the sensor output is read, and zero-point correction is executed by the above described formulas (1) and (2) for that value. Then, the filter failure determination control and the like are executed by using the sensor output $V_{out}$ after the zero-point correction.

Figure 6:
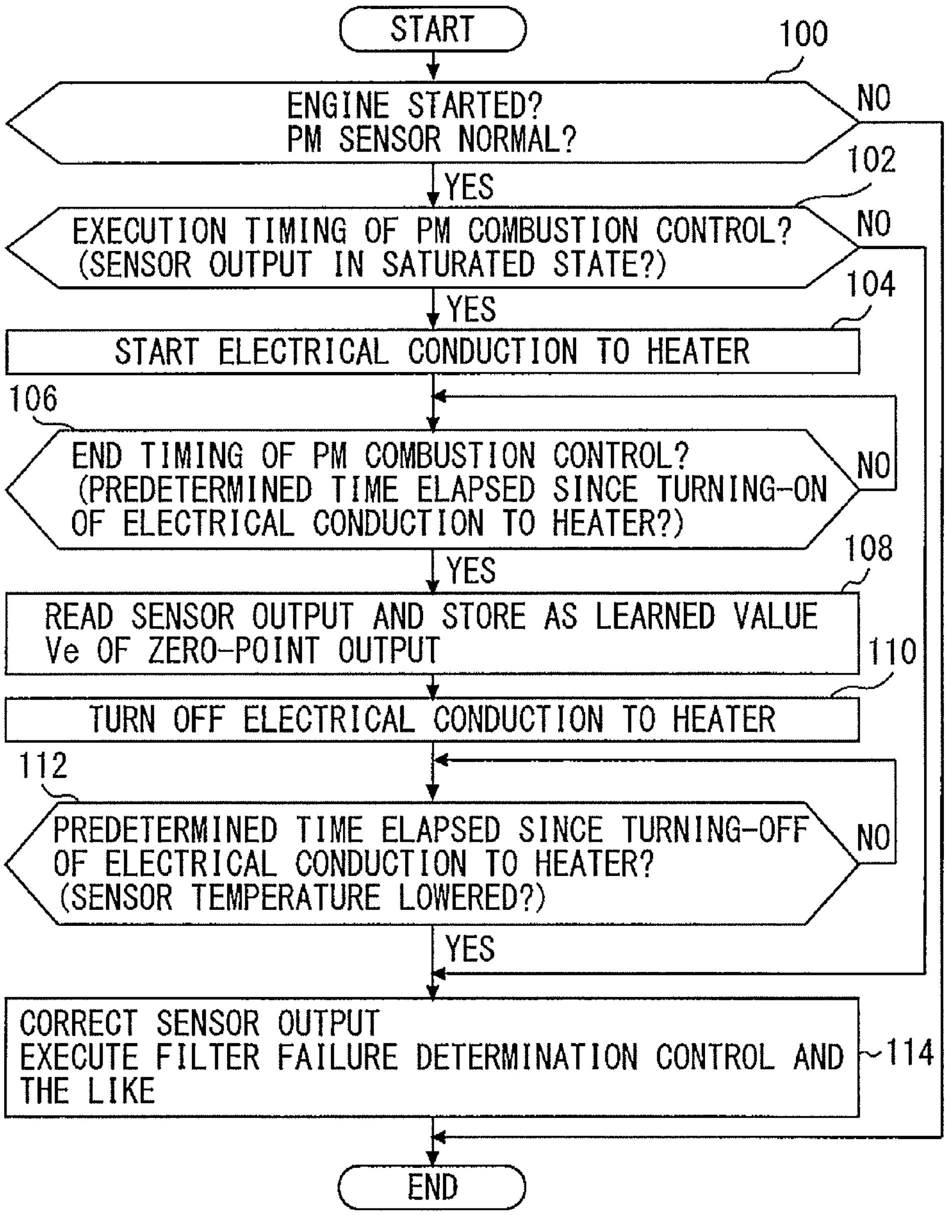
FIG. 6 is a flowchart illustrating control executed by the ECU in the first embodiment of the present invention.

In the first embodiment, Steps 102, 104, 106, and 110 in FIG. 6 illustrate a specific example of the PM combusting means in claim 1, and Steps 108 and 114 illustrate a specific example of the zero-point correcting means in claims 1 and 2.

Second Embodiment

Figure 7:
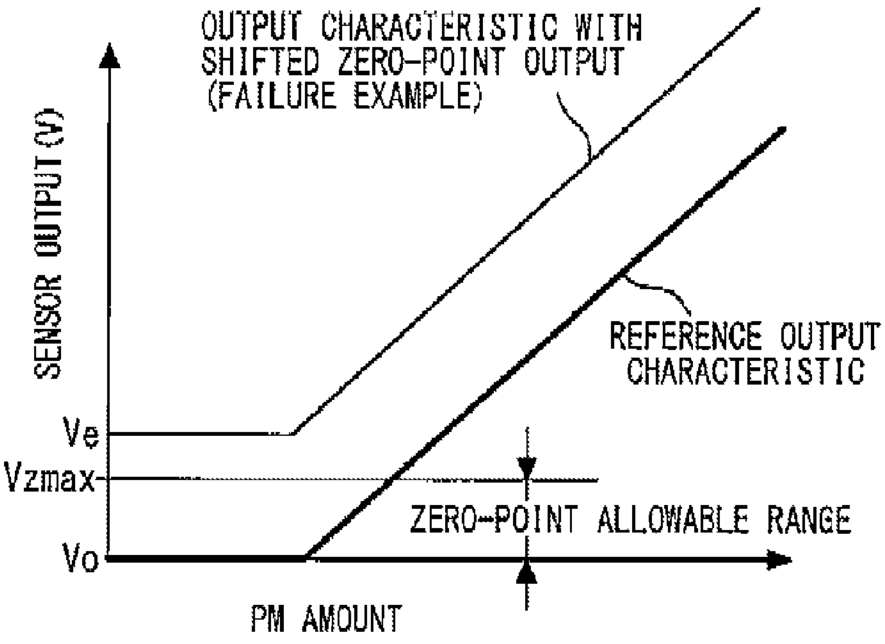
FIG. 7 is an explanatory diagram illustrating an example of a zero-point allowable range in a second embodiment of the present invention.

Subsequently, a second embodiment of the present invention will be described by referring to FIGS. 7 to 9. In this embodiment, in the same configuration and control as those in the above described first embodiment, the zero-point abnormality determination control is executed as a feature. In this embodiment, the same reference numerals are given to the same constituent elements as those in the first embodiment, and the explanation will be omitted.

Features of Second Embodiment

In this embodiment, the zero-point abnormality determination control is executed by using the zero-point output $V_e$ obtained by the zero-point correction control. In this control, it is determined that the PM sensor 16 has failed if the zero-point output $V_e$ goes out of a predetermined range (hereinafter referred to as a zero-point allowable range), and the zero-point allowable range is set in advance on the basis of design specification of the sensor or the detection circuit and the like. FIG. 7 is an explanatory diagram illustrating an example of the zero-point allowable range in the second embodiment of the present invention. As illustrated in this figure, the zero-point allowable range has the predetermined upper limit value Vzmax and the lower limit value, and the lower limit value is set to a value equal to the above described reference value V0, for example. If the zero-point output $V_e$ is larger than the upper limit value Vzmax ($V_e$>Vzmax), and if the zero-point output $V_e$ is smaller than the reference value V0 ($V_e$<V0), it is considered that the sensor function has deteriorated due to the cause which will be described later, and it is determined that the PM sensor has failed.

Moreover, in the zero-point abnormality determination control, if it is determined that the PM sensor has failed, a cause of a failure (type) is estimated on the basis of a magnitude of difference between the zero-point output $V_e$ and the reference value V0. Specifically speaking, first, if the zero-point output $V_e$ is larger than the upper limit value Vzmax (that is, if the zero-point output $V_e$ is out of the zero-point allowable range and is larger than the reference value V0), even if the PM combustion control is executed, a phenomenon in which the resistance value between the electrodes 22 has not sufficiently lowered occurs. In this case, it is estimated that the PM removing capacity deteriorated due to a failure of the heater 26 or fixation of the PM, for example, or a failure such as short-circuit between the electrodes caused by foreign substance or the like has occurred. On the other hand, if the zero-point output $V_e$ is smaller than the reference value V0, since the resistance value between the electrodes 22 has increased since start of use of the PM sensor, it is estimated that the electrodes 22 have been exhausted while the sensor is used, and a failure such as a phenomenon in which an electrode interval enlarges (electrode coagulation) or the like has occurred.

According to the above described control, it can be determined by using the zero-point correction control whether the variation of the zero-point output $V_e$ is within a normal range. As a result, a failure of the PM sensor 16 such that the zero-point output is largely shifted can be easily detected without providing a special failure diagnosis circuit or the like, and when a failure is detected, it can be rapidly handled by means of control, an alarm and the like. Moreover, according to this embodiment, a cause of a failure can be estimated on the basis of the magnitude of difference between the zero-point output and the reference value, and an appropriate action can be taken in accordance with the cause of the failure.

Specific Processing for Realizing Second Embodiment

Subsequently, specific processing for realizing the above described control will be described by referring to FIGS. 8 and 9. First, FIG. 8 is a flowchart illustrating control executed by the ECU in the second embodiment of the present invention. A routine illustrated in this flowchart is assumed to be repeatedly executed during an operation of the engine. In the routine illustrated in FIG. 8, first, at Steps 200 to 208, processing similar to Steps 100 to 108 in the first embodiment (FIG. 6) is executed.

Subsequently, at Step 210, it is determined whether or not the sensor output $V_e$ is within the zero-point allowable range (that is, whether or not the sensor output $V_e$ is not more than the upper limit value Vzmax and not less than the reference value V0). If this determination is positive, it is determined that the PM sensor 16 is normal, and at Step 212, electrical conduction to the heater 26 is stopped. Then, at Steps 214 and 216, processing similar to Steps 112 and 114 in the first embodiment is executed.

On the other hand, at Step 210, if it is determined that the sensor output $V_e$ is out of the zero-point allowable range (that is, the sensor output $V_e$ is either larger the upper limit value Vzmax or smaller than the reference value V0), first, at Step 218, it is determined that the PM sensor has failed. Then, at Step 220, the failure cause estimation processing which will be described later is executed, and at Step 222, electrical conduction to the heater 26 is stopped.

Subsequently, the failure cause estimation processing will be described by referring to FIG. 9. FIG. 9 is a flowchart illustrating the failure cause estimation processing in FIG. 8. In the failure cause estimation processing, first, at Step 300, it is determined whether or not the sensor output $V_e$ is larger than the upper limit value Vzmax. If this determination is positive, at Step 302, it is estimated that the failure of the PM sensor 16 has occurred due to the deterioration of removing capacity or a failure such as short-circuit between the electrodes 22 and the like. On the other hand, if the determination at Step 300 is negative, at Step 304, it is determined whether or not the sensor output $V_e$ is smaller than the reference value V0. If this determination is positive, it is estimated that the failure is caused by the above described electrode coagulation or the like. Moreover, if the determination at Step 304 is negative, it is estimated that the failure is caused by the other causes.

Figure 8:
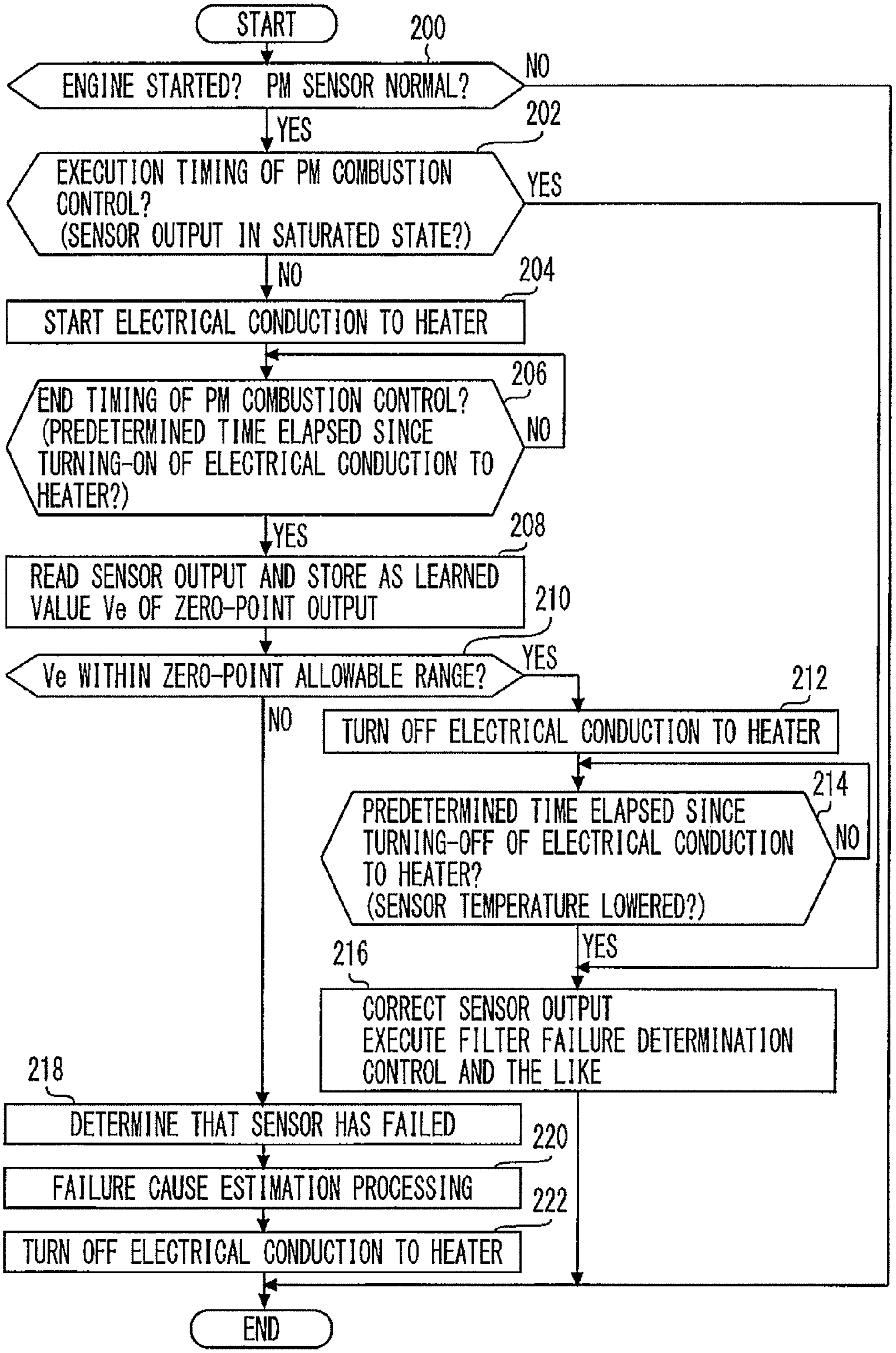
FIG. 8 is a flowchart illustrating control executed by the ECU in the second embodiment of the present invention.
Figure 9:
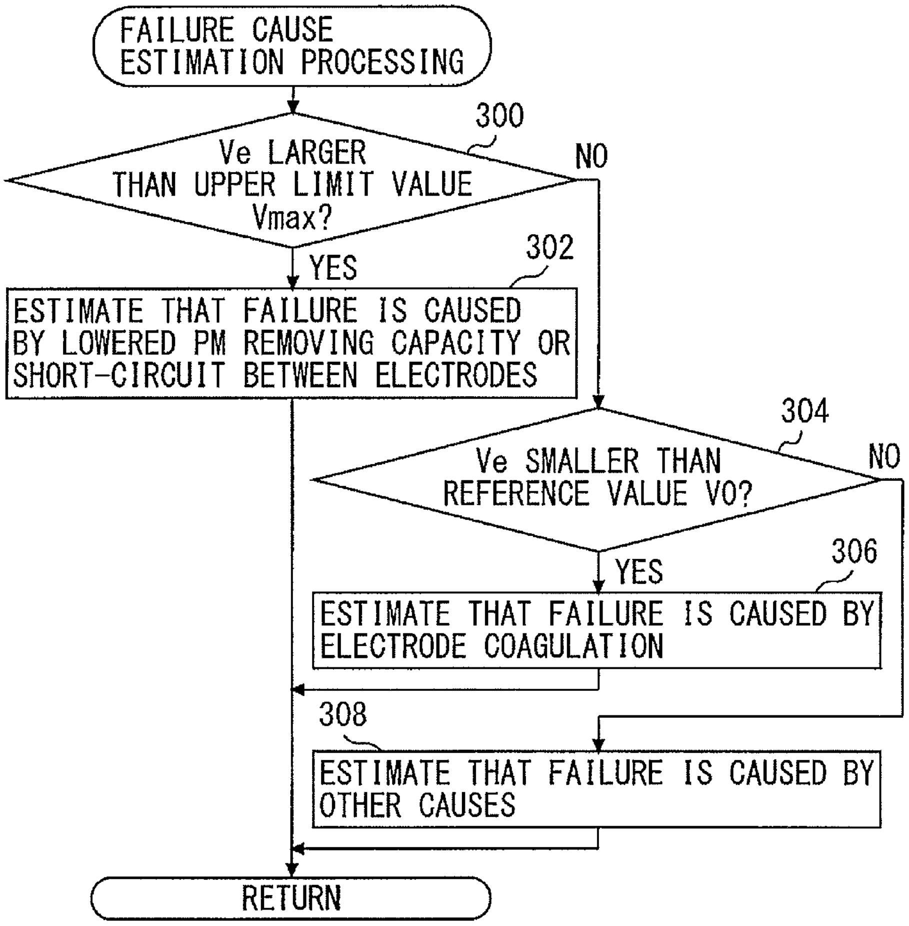
FIG. 9 is a flowchart illustrating the failure cause estimation processing in FIG. 8.

In the above described second embodiment, Steps 202, 204, 206, 212, and 222 in FIG. 8 illustrate a specific example of the PM combusting means in claim 1, and Steps 208 and 216 illustrate a specific example of the zero-point correcting means in claims 1 and 2. Moreover, Steps 210 and 218 illustrate a specific example of the zero-point abnormality determining means in claim 3, and Steps 300 to 308 in FIG. 9 illustrate a specific example of the failure cause estimating means in claim 4.

Moreover, in the second embodiment, the lower limit value of the zero-point allowable range is set to a value equal to the reference value V0 of the zero-point output. However, the present invention is not limited to that and the lower limit value of the zero-point allowable range may be set to an arbitrary value different from the above described reference value V0.

Third Embodiment

Subsequently, a third embodiment of the present invention will be described by referring to FIGS. 10 to 12. In this embodiment, in addition to the same configuration and control as those in the above described first embodiment, the zero-point correction control is executed as a feature. In this embodiment, the same reference numerals are given to the same constituent elements as those in the first embodiment, and the explanation will be omitted.

Features of Third Embodiment

In this embodiment, sensitivity correction control is executed for correcting variation in the sensor output sensitivity by using the PM combustion control. FIG. 10 is an explanatory diagram for explaining contents of the sensitivity correction control in the third embodiment of the present invention. As illustrated in this figure, while the PM sensor is operated, the PM captured amount increases as time elapses, and the sensor output also increases with that. When the sensor output reaches a predetermined output upper limit value Vh corresponding to the saturated state, the PM combustion control is executed, and electrical conduction to the heater 26 is started. In this state, since the PM between the electrodes 22 is combusted and gradually removed, the sensor output gradually decreases toward the zero-point output.

Figure 10:
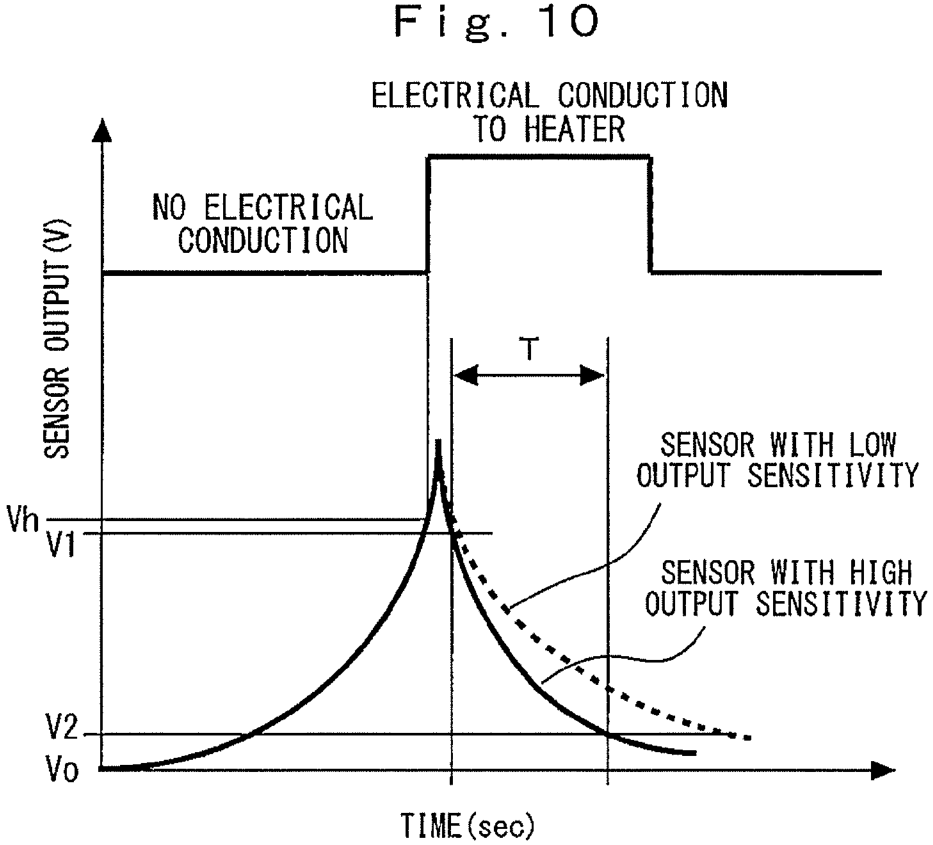
FIG. 10 is an explanatory diagram for explaining contents of sensitivity correction control in a third embodiment of the present invention.

Here, in a PM sensor with high sensor output sensitivity (a rate of change in the sensor output with respect to the change in the PM caught amount), as electrical conduction to the heater (removal of the PM) progresses, the sensor output decreases relatively quickly as illustrated in a solid line in FIG. 10. On the other hand, in a sensor with low output sensitivity, even if electricity is turned on to the heater under the same condition as that of the sensor with high output sensitivity, the sensor output decreases gently as illustrated in a dotted line in FIG. 10. In other words, a supply power amount to the heater required for changing the sensor output by a certain amount tends to increase more if the sensor output sensitivity is lower. In the sensitivity correction control, variation in the output sensitivity is corrected by using this tendency.

Specifically speaking, in the sensitivity correction control, first, in a state electricity is turned on to the heater 26 by the PM combustion control, a period T during which the sensor output changes from a first signal value V1 to a second signal value V2 (V1>V2) is detected. A difference between the signal values V1 and V2 is preferably set as large as possible in order to improve variation correction accuracy. Subsequently, a supply power integrated amount W which is a total sum of power supplied to the heater 26 within the period T is measured, and a sensitivity coefficient K which is a correction coefficient of the output sensitivity is calculated on the basis of this supply power integrated amount W. The sensitivity coefficient K is a correction coefficient for calculating a sensor output after sensitivity correction by being multiplied by the sensor output before sensitivity correction.

Figure 11:
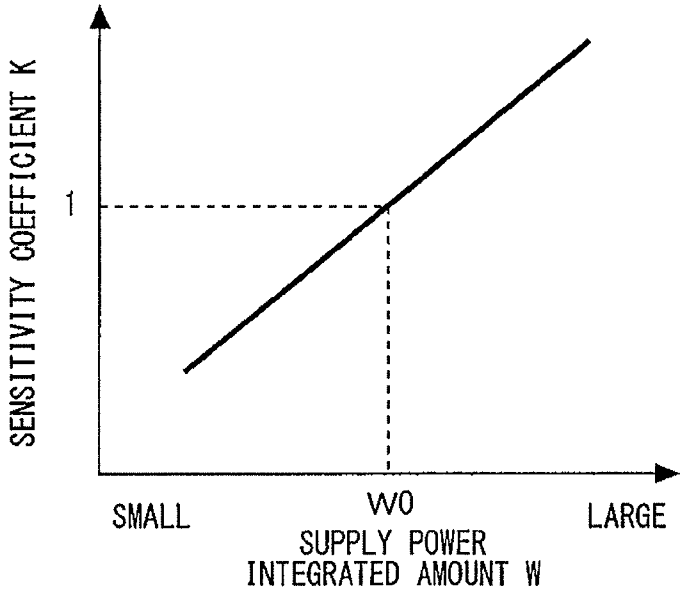
FIG. 11 is a characteristic diagram for calculating a sensitivity coefficient of the sensor on the basis of a supply power integrated amount of a heater.

FIG. 11 illustrates a characteristic diagram for calculating a sensitivity coefficient of the sensor on the basis of the supply power integrated amount of the heater. As illustrated in this figure, the sensitivity coefficient K is set so that it is "K=1" when the measured supply power integrated amount W is equal to a predetermined reference value W0. This reference value W0 corresponds to the reference output characteristic described in the first embodiment (FIG. 7), for example. It is set such that the more the sensitivity coefficient K increases, the larger the supply power integrated amount W is than the reference value W0, that is, the lower the sensor output sensitivity is. The sensitivity coefficient K calculated as above is stored as a learned value reflecting variation in the output sensitivity in a nonvolatile memory and the like.

Subsequently, in the above described filter failure determination control and the like, if an output of the PM sensor 16 is to be used, a sensor output is corrected on the basis of the above learned result. Specifically, a sensor output $V_{out}$ is calculated by the following formula (3) on the basis of the sensor output $V_s$ at an arbitrary point of time, the learned value K of the sensitivity coefficient, and the above described formulas (1) and (2). This sensor output $V_{out}$ is the final sensor output corrected by the above described zero-point correction control and sensitivity correction control and is used for the filter failure determination control and the like.

$$V_{out}=\{V_s-(V_e-V0)\}*K \tag{3}$$

According to the above described control, even in a state where the PM sensor 16 is operated as usual, the sensitivity coefficient K including the variation specific to the sensor can be calculated smoothly by using timing of combusting the PM between the electrodes 22 by the PM combustion control. Thus, the sensor output $V_s$ at an arbitrary point of time can be appropriately corrected on the basis of the calculated sensitivity coefficient K, and an influence of the output sensitivity variation on the sensor output can be reliably removed. Therefore, according to this embodiment, sensitivity correction of the PM sensor can be easily made by using the existing PM combustion control, and detection accuracy of the sensor can be reliably improved.

In the above description, it is configured such that the sensor output sensitivity is corrected on the basis of the supply power integrated amount W within the period T. However, assuming that the power supply state to the heater 26 is constant over time, the supply power integrated amount W is in proportion to time length (elapsed time) t of the period T. Therefore, the present invention may be configured to correct the output sensitivity on the basis of an elapsed time t, while constant power is supplied to the heater 26 over time.

Specifically speaking, when sensitivity correction control is executed, the elapsed time t taken for the period T during which the sensor output changes from the signal value V1 to the signal value V2 is measured in a state where a voltage and a current supplied to the heater 26 is kept constant. Moreover, by preparing data in which the lateral axis of the data illustrated in FIG. 11 is replaced by the elapsed time t in advance, and the sensitivity coefficient K may be calculated on the basis of this data and a measured value of the elapsed time t. According to this configuration, sensitivity correction control can be executed only by measuring time without integrating supply power to the heater 26, and control can be simplified.

Specific Processing for Realizing Third Embodiment

Subsequently, specific processing for realizing the above described control will be described by referring to FIG. 12. FIG. 12 is a flowchart illustrating control executed by the ECU in the third embodiment of the present invention. A routine illustrated in this flowchart is assumed to be repeatedly executed during an operation of the engine. In the routine illustrated in FIG. 12, first, at Steps 400 to 404, processing similar to Steps 100 to 104 in the first embodiment (FIG. 6) is executed. As a result, the heater 26 is operated, and the sensor output begins to be lowered and thus, at Step 106, it is determined whether or not the sensor output has lowered to a first detection value V1 and waits for this determination to be positive.

If the determination at Step 406 is positive, supply power to the heater 26 is integrated at Step 408, and calculation of the supply power integrated amount W is started (alternatively, measurement of elapsed time is started in a state where power supply to the heater is kept constant over time). Subsequently, at Step 410, it is determined whether or not the sensor output has lowered to a second detection value V2, and the above described measurement is continued until this determination is positive. If the determination at Step 410 is positive, measurement of the supply power integrated amount W (elapsed time) is stopped at Step 412. At Step 414, the sensitivity coefficient K is calculated on the basis of the above described measurement result, and the value is stored as a learned value.

Subsequently, at Step 416, it is determined whether or not end timing of the PM combustion control has arrived, and electrical conduction is continued until this determination is positive. If the above described conduction time has elapsed, electrical conduction to the heater 26 is turned off at Step 418, and then, after predetermined time has elapsed and the temperature of the electrodes 22 has sufficiently lowered, measurement of the PM by the PM sensor is started. Subsequently, at Step 420, the sensor output is read, and zero-point and sensitivity correction is executed by the above described formula (3) for the value. Then, the filter failure determination control and the like are executed by using the sensor output $V_{out}$ after the correction.

Figure 12:
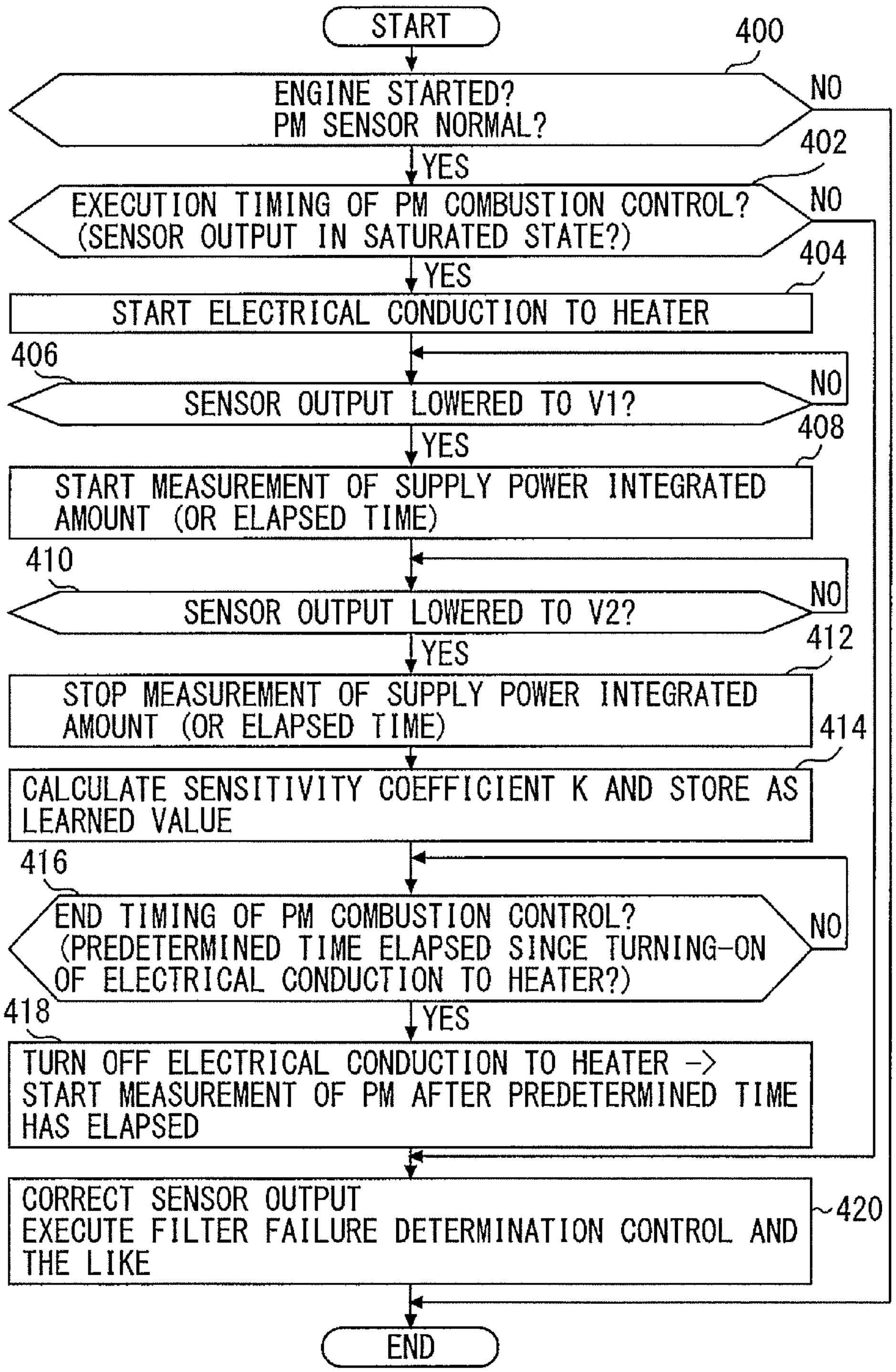
FIG. 12 is a flowchart illustrating control executed by an ECU in the third embodiment of the present invention.

In the above described third embodiment, Steps 402, 404, 416, and 418 in FIG. 12 illustrate a specific example of the PM combusting means in claim 1, and Steps 406, 408, 410, 412, 414, and 420 illustrate a specific example of the sensitivity correcting means in claims 5 and 6.

Fourth Embodiment

Figure 13:
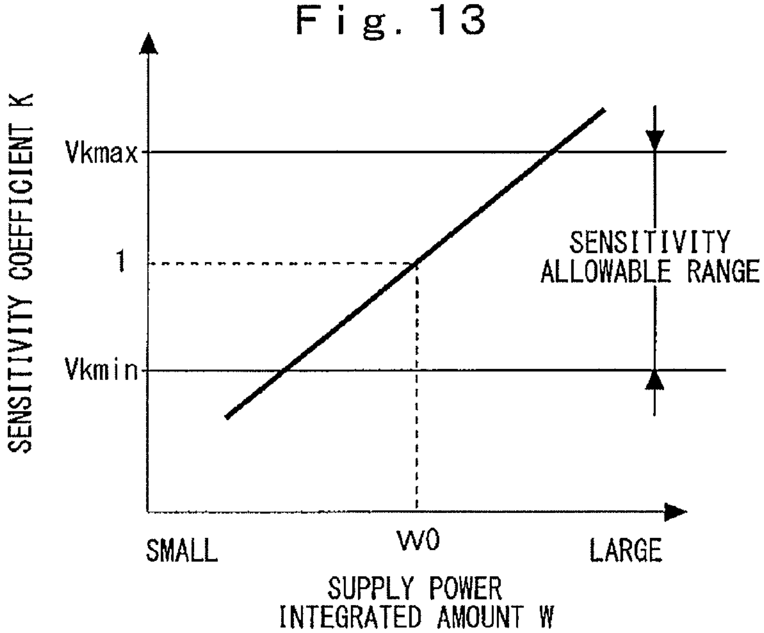
FIG. 13 is an explanatory diagram illustrating an example of a sensitivity allowable range in a fourth embodiment of the present invention.
Figure 14:
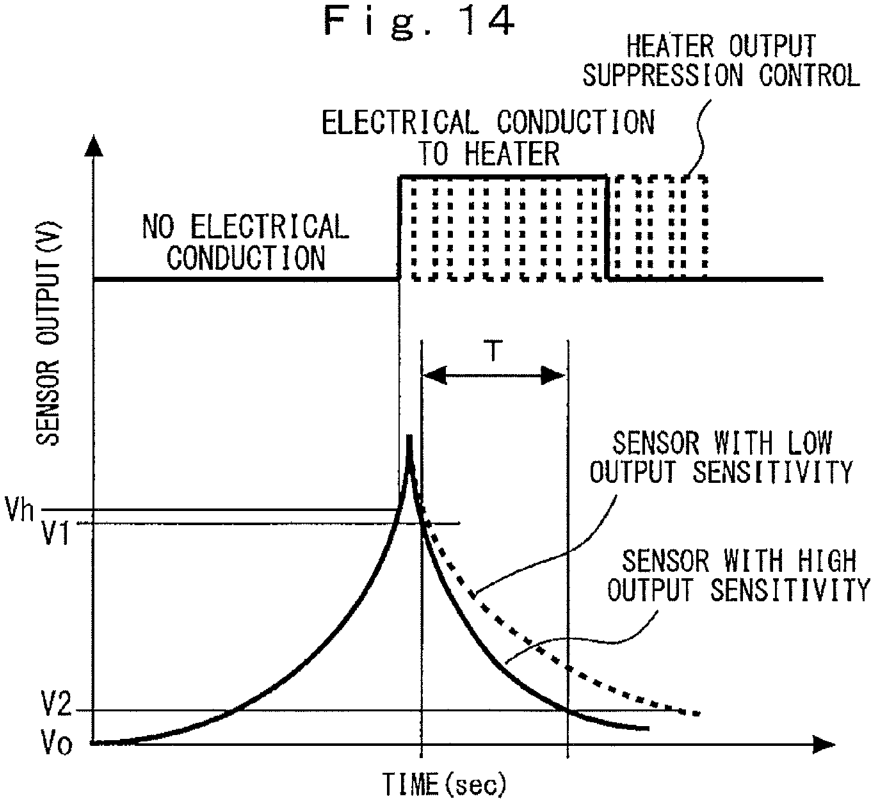
FIG. 14 is an explanatory diagram illustrating contents of the heater output suppression control.

Subsequently, a fourth embodiment of the present invention will be described by referring to FIGS. 13 to 15. In this embodiment, in addition to the same configuration and control as those in the above described third embodiment, sensitivity abnormality determination control is executed as a feature. In this embodiment, the same reference numerals are given to the same constituent elements as those in the first embodiment, and the explanation will be omitted.

Features of Fourth Embodiment

In this embodiment, sensitivity abnormality determination control is executed by using the sensitivity coefficient K obtained by the sensitivity correction control. In this control, it is determined that the PM sensor 16 has failed if the sensitivity coefficient K goes out of a predetermined range (hereinafter referred to as a sensitivity allowable range), and the sensitivity allowable range is set in advance on the basis of design specification of the sensor or the detection circuit and the like. FIG. 13 is an explanatory diagram illustrating an example of the sensitivity allowable range in the fourth embodiment of the present invention. As illustrated in this figure, the sensitivity allowable range has predetermined upper limit value Vkmax and lower limit value Vkmin. If the sensitivity coefficient K is larger than the upper limit value Vkmax ($K>Vkmax$), and if the sensitivity coefficient K is smaller than the lower limit value Vkmin ($K<Vkmin$), it is considered that the sensor function has deteriorated, and it is determined that the PM sensor has failed.

According to the above described control, it can be determined whether variation in the output sensitivity is within a normal range by using the sensitivity correction control. As a result, a failure of the PM sensor 16 such that the output sensitivity is largely shifted can be easily detected without providing a special failure diagnosis circuit or the like, and when a failure is detected, it can be rapidly handled by means of control, an alarm and the like.

Moreover, if sensitivity correction control or sensitivity abnormality determination control is to be executed, the heater output suppression control for suppressing an output of the heater 26 more than usual is preferably executed. FIG. 14 is an explanatory diagram illustrating contents of the heater output suppression control. This control suppresses the supply power to the heater to approximately 70%, for example, of the normal PM combustion control (when sensitivity correction control is not executed), and the PM between the electrodes 22 is combusted slowly. Specific methods of suppressing the supply power preferably include lowering of a voltage to be applied to the heater by means such as PWM and the like, for example, or lowering of a target temperature when temperature control is made for the heater.

According to the heater output suppression control, the following working effects can be obtained. First, if the heater 26 is operated at the maximum output (100%) as in the usual PM combustion control, the PM between the electrodes 22 is combusted and removed instantaneously, and thus, the sensor output changes from the signal value V1 to the signal value V2 in a short time. In this state, a large difference cannot easily occur in the above described supply power integrated amount W or the elapsed time t between the sensor with the high output sensitivity and the sensor with the low output sensitivity. On the other hand, according to the heater output suppression control, the PM between the electrodes 22 can be removed slowly, and the period T during which the sensor output changes from the signal value V1 to the signal value V2 can be prolonged. As a result, a difference in the supply power integrated amount W or the elapsed time t can be enlarged between the sensor with high output sensitivity and the sensor with low output sensitivity. Therefore, in the sensitivity correction control, the correction accuracy of the output sensitivity can be improved, and in the sensitivity abnormality determination control, the determination accuracy can be improved.

Specific Processing for Realizing Fourth Embodiment

Subsequently, a specific processing for realizing the above described control will be described by referring to FIG. 15. FIG. 15 is a flowchart illustrating control executed by the ECU in the fourth embodiment of the present invention. A routine illustrated in this flowchart is assumed to be repeatedly executed during an operation of the engine. In the routine illustrated in FIG. 15, first, at Step 500 and 502, processing similar to Steps 400 and 402 in the third embodiment (FIG. 12) is executed. If determination at Step 502 is positive, the usual PM combustion control is executed at Step 504, and electrical conduction to the heater 26 is started. Subsequently, at Steps 506 to 510, processing similar to Steps 416 to 420 in the third embodiment is executed, and this routine is terminated.

On the other hand, if the determination at Step 502 is negative, it is not execution timing of the PM combustion control and thus, at Step 512, it is determined whether or not it is execution timing of sensitivity correction control set in advance (sensitivity correction control is executed once at each operation of the engine and the like, for example). If the determination at Step 512 is positive, at Steps 514 to 524, the sensitivity correction control is executed. Specifically speaking, first at Step 514, the above described the heater output suppression control is executed, and electrical conduction to the heater 26 is started. As a result, the heater 26 is operated, and the sensor output begins to lower and thus, at Steps 516 to 524, processing similar to Steps 406 to 414 in the third embodiment is executed, and the sensitivity coefficient K is calculated and stored.

Subsequently, at Step 526, it is determined whether or not the calculated sensitivity coefficient K is within a sensitivity allowable range. Specifically speaking, at Step 526, it is determined whether or not Vkmax K Vkmin is true with respect to the upper limit value Vkmax and the lower limit value Vkmin of the sensitivity allowable range. If this determination is positive, since the sensitivity coefficient K is normal, the above described Steps 506 to 510 are executed, and this routine is terminated. On the other hand, if the determination at Step 526 is negative, since the sensitivity coefficient K is abnormal, at Step 528, it is determined that the PM sensor has failed. Then, at Step 530, electricity to the heater 26 is turned off.

Figure 15:
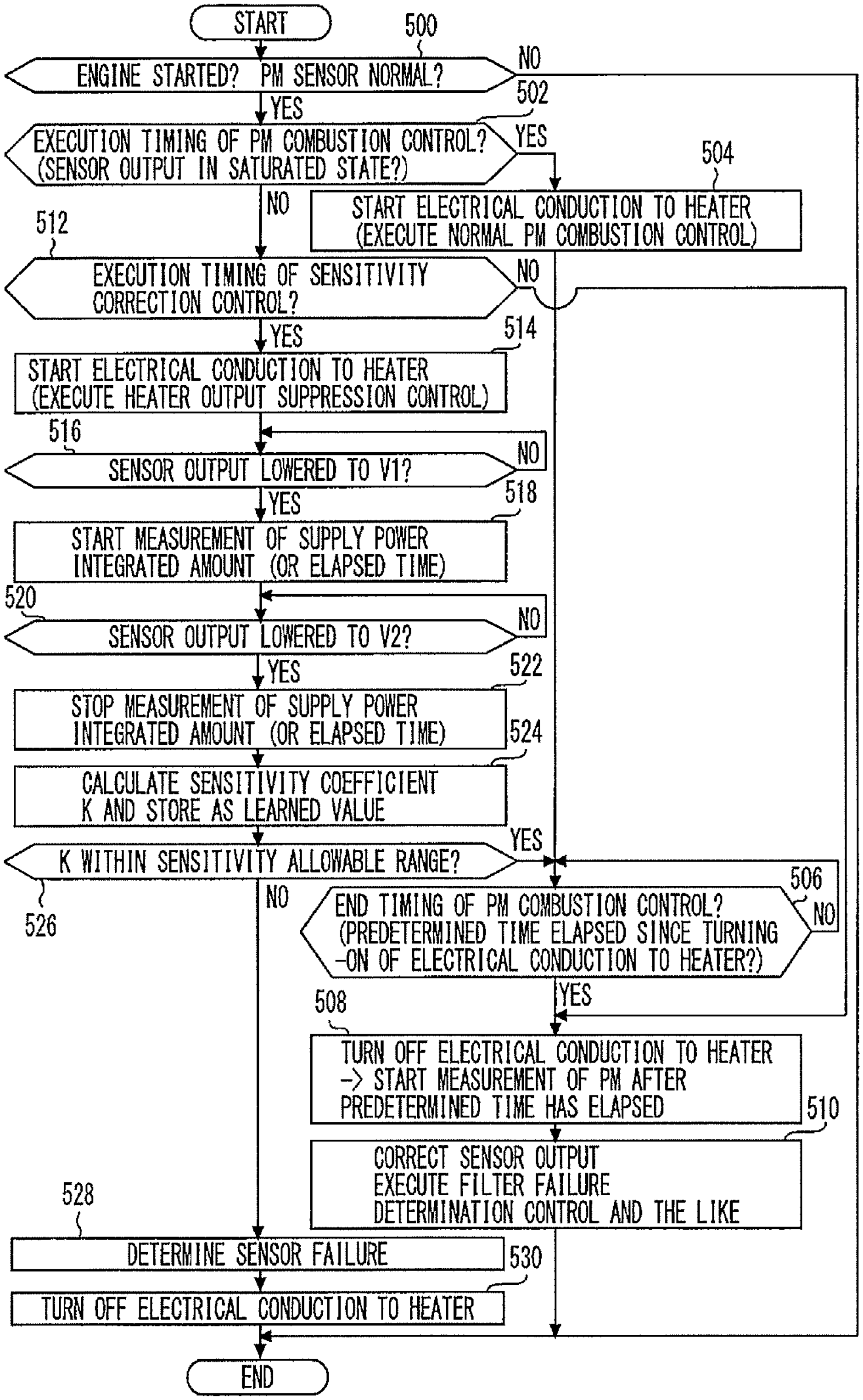
FIG. 15 is a flowchart illustrating control executed by the ECU in the second embodiment of the present invention.

In the above described fourth embodiment, Steps 502, 504, 506, 508, 514, and 530 in FIG. 15 illustrate a specific example of the PM combusting means in claim 1, and Steps 510, 516, 518, 520, 522, and 524 illustrate a specific example of the sensitivity correcting means in claims 5 and 6. Moreover, Steps 526 and 258 illustrate a specific example of the sensitivity abnormality determining means in claim 6.

Moreover, in the first to fourth embodiments, individual configurations are described, respectively. However, the present invention includes a configuration in which the first and second embodiments are combined, a configuration in which the first and third embodiments are combined, a configuration in which the first, third and fourth embodiments are combined, a configuration in which the first to third embodiments are combined, and a configuration in which the first to fourth embodiments are combined. Moreover, in the fourth embodiment, in a configuration in which the sensitivity correction control and the sensitivity abnormality determination control are executed, the heater output suppression control is assumed to be executed. However, the present invention is not limited to that, and in a configuration in which only the sensitivity correction control is executed (third embodiment), it may be configured that the heater output suppression control is executed.

Moreover, in each of the above described embodiments, the electric resistance type PM sensor 16 is used as an example of explanation. However, the present invention is not limited to that and may be applied to PM sensors other than the electric resistance type as long as it is a capturing type PM sensor capturing the PM for detecting the PM amount in the exhaust gas. That is, the present invention can be applied also to an electrostatic capacity type PM sensor detecting the PM amount in the exhaust gas by measuring electrostatic capacity of a detection portion changing in accordance with the captured amount of the PM and a combustion type PM sensor detecting the PM amount in the exhaust gas by measuring time spent for combustion of the captured PM or a heat generation amount during combustion, for example.

DESCRIPTION OF REFERENCE NUMERALS

10 engine (internal combustion engine), 12 exhaust passage, 14 particulate filter, 16 PM sensor, 18 ECU, 20 insulating material, 22 electrode (detection portion), 24 gap, 26 heater, 28 voltage source, 30 fixed resistor, W supply power integrated amount (parameter), t elapsed time (parameter)

The invention claimed is:

1. A controller for an internal combustion engine comprising:

a PM sensor having a detection portion for capturing particulate matters in an exhaust gas and outputting a detection signal according to the captured amount and a heater for heating the detection portion;

a PM combusting unit for combusting and removing the particulate matters by electrical conduction to the heater if a predetermined amount of the particulate matters are captured by the detection portion of the PM sensor; and a zero-point correcting unit for obtaining the detection signal outputted from the detection portion as a zero-point output of the PM sensor and correcting the detection signal at an arbitrary point of time on the basis of the zero-point output under condition that a predetermined time required for completing combustion of particulate matters has elapsed after electrical conduction to the heater by the PM combusting unit is started and the electrical conduction has been kept.

2. The controller for an internal combustion engine according to claim 1, wherein said zero-point correcting unit is configured to correct the detection signal at an arbitrary point of time on the basis of a difference between the zero-point output obtained when electrical conduction to said heater is turned on and a reference value of the zero-point output stored in advance.

3. The controller for an internal combustion engine according to claim 1, further comprising:

a zero-point abnormality determining unit for determining that the PM sensor has failed if the zero-point output obtained by the zero-point correcting unit is out of a predetermined zero-point allowable range.

4. The controller for an internal combustion engine according to claim 3, wherein said PM sensor is an electric resistance type sensor outputting the detection signal according to a resistance value when said resistance value between a pair of electrodes is changed in accordance with an amount of particulate matters caught between the electrodes constituting said detection portion; and a failure cause estimating unit is provided for estimating a cause of the failure on the basis of a size relationship between the zero-point output obtained by said zero-point correcting unit and a reference value of the zero-point output stored in advance, if it is determined by said zero-point abnormality determining unit that said PM sensor has failed.

5. The controller for an internal combustion engine according to claim 1, further comprising:

a sensitivity correcting unit that is provided for measuring a parameter corresponding to power supplied to said heater while said detection signal changes from a first signal value to a second signal value different from the signal value in a state where electrical conduction to said heater is turned on by said PM combusting unit and for correcting output sensitivity of said detection signal with respect to the caught amount of the particulate matters on the basis of the parameter.

6. The controller for an internal combustion engine according to claim 5, wherein the sensitivity correcting unit is configured to calculate a detection signal after sensitivity correction by calculating a sensitivity coefficient whose value increases as the parameter becomes larger and by multiplying the detection signal outputted from the detection portion before the sensitivity correction by the sensitivity coefficient, and the controller for an internal combustion engine comprises a sensitivity abnormality determining unit for determining that the PM sensor has failed if the sensitivity coefficient is out of a predetermined sensitivity allowable range.

* * * * *